(12) United States Patent
Kamijima et al.

(10) Patent No.: US 8,458,281 B2
(45) Date of Patent: Jun. 4, 2013

(54) FILE SHARING SYSTEM

(75) Inventors: Yuki Kamijima, Fuchu (JP); Yoshiro Osaki, Kawasaki (JP); Naoko Satoh, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 12/723,043

(22) Filed: Mar. 12, 2010

(65) Prior Publication Data

US 2010/0332611 A1 Dec. 30, 2010

(30) Foreign Application Priority Data

Jun. 29, 2009 (JP) ................................ P2009-154071

(51) Int. Cl.
*G06F 15/167* (2006.01)

(52) U.S. Cl.
USPC ............ 709/212; 709/217; 709/218; 709/219

(58) Field of Classification Search
USPC .................................. 709/212, 217, 218, 219
See application file for complete search history.

(56) References Cited

U.S. PATENT DOCUMENTS

| | | | |
|---|---|---|---|
| 5,608,870 A * | 3/1997 | Valiant .......................... | 711/100 |
| 6,898,639 B2 | 5/2005 | Muramatsu | |
| 7,716,307 B1 * | 5/2010 | Ben-Shaul et al. ............ | 709/219 |
| 2003/0174132 A1 * | 9/2003 | Kunimatsu et al. ............ | 345/419 |
| 2005/0198401 A1 * | 9/2005 | Chron et al. ................... | 709/250 |
| 2010/0115535 A1 | 5/2010 | Kamii et al. | |
| 2010/0235321 A1 * | 9/2010 | Shukla et al. ................. | 707/610 |
| 2012/0078958 A1 * | 3/2012 | Whitmyer, Jr. ............... | 707/769 |

FOREIGN PATENT DOCUMENTS

| | | |
|---|---|---|
| EP | 2 151 764 A1 | 2/2010 |
| JP | 6-162066 | 6/1994 |
| JP | 2002-208016 | 7/2002 |
| JP | 2008-269331 | 11/2008 |

OTHER PUBLICATIONS

Office Action issued by the Japanese Patent Office on Jan. 25, 2011, for Japanese Patent Application No. 2009-154071, and English-language translation thereof.

* cited by examiner

*Primary Examiner* — Firmin Backer
*Assistant Examiner* — Jonathan Bui
(74) *Attorney, Agent, or Firm* — Finnegan, Henderson, Farabow, Garrett & Dunner, L.L.P.

(57) ABSTRACT

To realize efficient processing regarding accesses to files. A remote controlling processing apparatus 14 of a file sharing system 10 is connected via a network 15 to a controlled processing apparatus 12 including a file storage part 17 in which a plurality of files 1, 2, 3 . . . are stored. Further, the remote controlling processing apparatus 14 includes: an access request generating part 19 generating access requests to the files 1, 2, 3 . . . in the file storage part 17; an access request storage part 22 in which the plural generated access requests are sequentially stored; and an access request notifying part 25 integrating plural ones of the access requests in the access request storage part 22 based on a storage status in the access request storage part 22 to notify the integrated access request to the controlled processing apparatus 12.

14 Claims, 8 Drawing Sheets

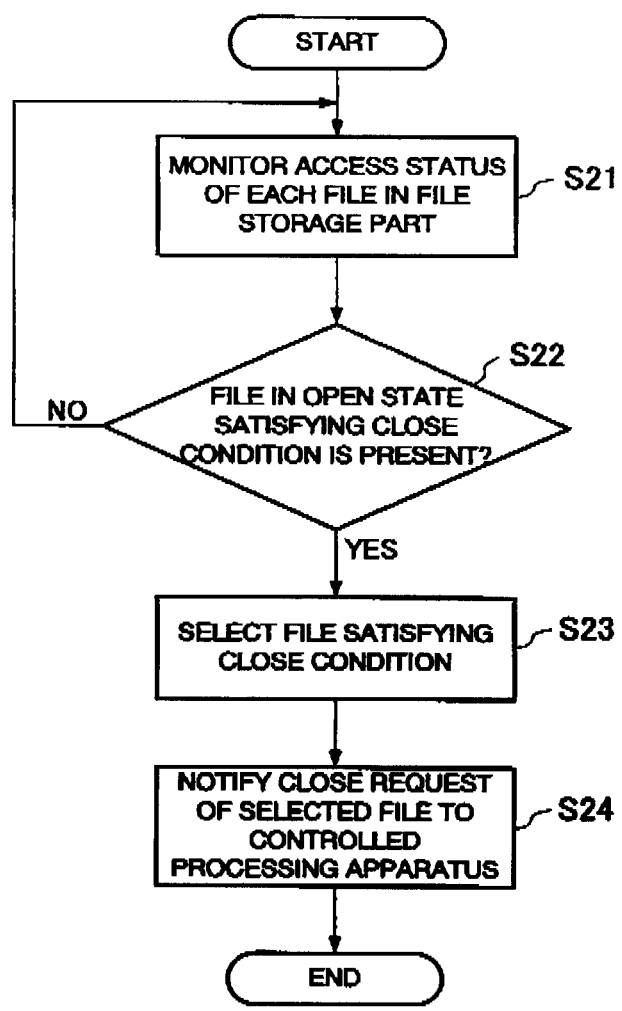

FILE SHARING SYSTEM

CROSS-REFERENCE TO RELATED APPLICATIONS

This application is based upon and claims the benefit of priority from the prior Japanese Patent Application No. 2009-154071, filed on Jun. 29, 2009; the entire contents of which are incorporated herein by reference.

BACKGROUND OF THE INVENTION

1. Field of the Invention

The present invention relates to a file sharing system for sharing a file among a plurality of apparatuses.

2. Description of the Related Art

Aiming at reducing a communication volume required for the transfer of draw commands in a distributed processing environment involving the possibility that the same or similar draw command groups are executed a plurality of times, there has been proposed a distributed processing system which, if the command groups have already been registered, reads the registered command groups at the time of the transfer of the draw commands from a command relay library to a command processing module and executes the drawing (see, for example, JP-A 2002-208016 (KOKAI)).

Further, there has been known a computer system or the like in which, for the purpose of reducing the conflict of access requests to the same storage unit, a plurality of access requests to the same storage unit generated from a plurality of access request origins at the same time or at different times are integrated into a single access request especially when these access requests are apart in terms of the generation time (see, for example, JP-A 6-162066 (KOKAI)).

As a function for realizing the access requests to the storage unit as described above, what is called a file management function or the like is used. The file management function is a function executing data processing corresponding to various kinds of commands (access requests) such as an open request, a read request, a write request, and a close request that a higher-level application generates for files stored on a storage medium such as a floppy (registered trademark) disk or a hard disk. Incidentally, when the storage medium storing the files and a file managing part realizing the file management function are installed on the same system, the various commands sent from the higher-level application to the file managing part are generally serially processed in order of the generation time of the commands.

Here, let us study a case where a file sharing function is realized by a controlled system such as a built-in system which has a storage medium storing a plurality files as access targets and operates with the minimum number of resources and thus has a relatively low processing specification and by a remote controlling system having application for accessing the plural files in the storage medium and having a relatively high processing specification.

In this case, if the remote controlling system sends a large number of various kinds of commands in a short time to the controlled system, the processing in the controlled system with a low processing specification cannot follow the commands and the controlled system cannot exhibit performance demanded by the application on the remote controlling system.

Further, an access to a file is executed basically in such order that the file is opened and then is closed after read or write is repeated several times, for instance. However, in a built-in system or the like, for instance, due to its specification, there is a limit to the number of files that can be kept open, and if files in number exceeding the limit number are to be opened, it is necessary to close some of the opened files so that the limit number is not exceeded.

Sending a large number of various commands in a short time under such restriction is accompanied by frequent opening and closing of the files. However, in the conventional processing serially processing various commands, there is a possibility that a file once closed is re-opened immediately, which means surplus processing time is practically spent.

BRIEF SUMMARY OF THE INVENTION

The present invention has an object to provide a file sharing system capable of efficient processing regarding accesses to files.

A file sharing system according to an aspect of the present invention includes: a first information processing apparatus including a file storage part in which a plurality of files are stored; and a second information processing apparatus connected to the first information processing apparatus via a network and capable of accessing each of the files in the file storage part, wherein the second information processing apparatus includes: an access request generating part generating access requests to the files in the file storage part; an access request storage part sequentially storing the plural access requests generated by the access request generating part; and an access request notifying part integrating a plural access requests in the access request storage part based on a storage status in the access request storage part to notify the integrated access request to the first information processing apparatus.

BRIEF DESCRIPTION OF THE DRAWINGS

FIG. 9 is a flowchart showing processing performed by the file managing part in FIG. 8.

DETAILED DESCRIPTION OF THE INVENTION

Hereinafter, embodiments of the present invention will be described based on the drawings.

(First Embodiment)

Figure 1:
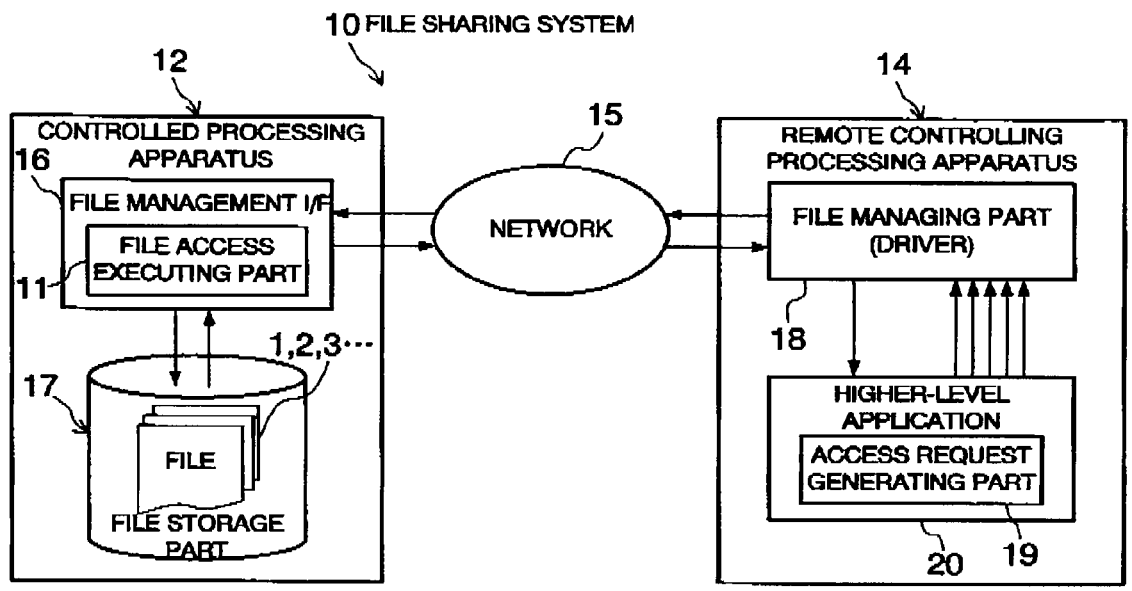
FIG. 1 is a functional block diagram showing the configuration of a file sharing system according to a first embodiment of the present invention.

As shown in FIG. 1, a file sharing system 10 according to this embodiment includes a controlled processing apparatus 12 functioning as a first information processing apparatus and a remote controlling processing apparatus 14 functioning as a second information processing apparatus.

The controlled processing apparatus 12 and the remote controlling processing apparatus 14 are connected to each other via a network 15 such as a LAN (Local Area Network). The controlled processing apparatus 12 is realized by a built-in system with a relatively low processing specification or the like, and as its operating system, what is called a real-time OS (real-time operating system) is employed.

The controlled processing apparatus 12 includes: a file management interface 16 having a file access executing part 11; and a file storage part 17 realized by an external (auxiliary) storage device. In the file storage part 17, stored are, a plurality of files 1, 2, 3 . . . containing, for example, a plurality of image data, audio data, subtitle data, and so on serving as sources of a plurality of moving image data.

In response to access requests sent from the remote controlling processing apparatus 14 via the network 15, the file management interface 16 executes accesses to the files 1, 2, 3 . . . in the file storage part 17, such as opening of a file corresponding to the access request (OPEN), and reading (READ) and writing (WRITE) of data from/to the corresponding file.

Here, the opening of a file is processing to establish the preparation for data read or write by activating the opened file, and the closing of a file is processing for canceling the preparation for data read and write. Further, an access to a file in the controlled processing apparatus 12 (the file storage part 17 thereof) according to this embodiment is performed basically in such order that the file is opened and is closed after read or write is next repeated several times. However, in the controlled processing apparatus 12 to which a built-in system or the like is applied, due to its specification, there is a limit to the number of files that can be kept open, and therefore, when a larger number of files than the limit number are to be opened, any of the opened files is closed before.

As shown in FIG. 1, the remote controlling processing apparatus 14 is realized by a computer apparatus with a relatively high processing specification such as a personal computer or a server and is capable of accessing the files 1, 2, 3 . . . in the file storage part 17 via the network 15 and the aforethe file management interface 16. The remote controlling processing apparatus 14 includes a file managing part 18 as a driver operating under the control by the operating system built in itself and a higher-level application 20.

The higher-level application 20 is a program realizing a function of reproducing a moving image generated by the synthesis of video, audio, subtitle, and so on, and includes an access request generating part 19. The access request generating part 19 generates access requests to the files 1, 2, 3 . . . in the file storage part 17 in the controlled processing apparatus 12. That is, the access request generating part 19 generates requests for opening the files in the file storage part 17 (open commands), requests for reading data from the files (read commands), requests for writing data to the files (write commands), and requests for closing the files (close commands). Such a higher-level application 20 frequently performs processing of generating a moving image by accessing the same subtitle file, the same audio file, or the like many times in a short time, and accordingly sends a large number of various kinds of access requests in a short time.

Figure 2:
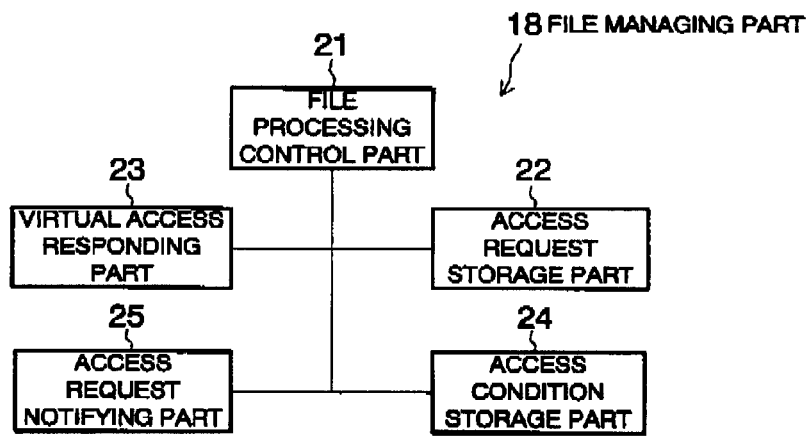
FIG. 2 is a functional block diagram showing the configuration of a file managing part included in the file sharing system in FIG. 1.

Next, the file managing part 18 will be described in detail. As shown in FIG. 1 and FIG. 2, the file managing part 18 includes an access request storage part 22, a virtual access responding part 23, an access condition storage part 24, an access request notifying part 25, and a file processing control part 21 centrally controlling these parts. Here, the file managing part 18 realizes a unique file management function so that the controlled processing apparatus 12 with a low processing specification is capable of following the access requests from the remote controlling processing apparatus 14 with a high processing specification.

Figure 4:
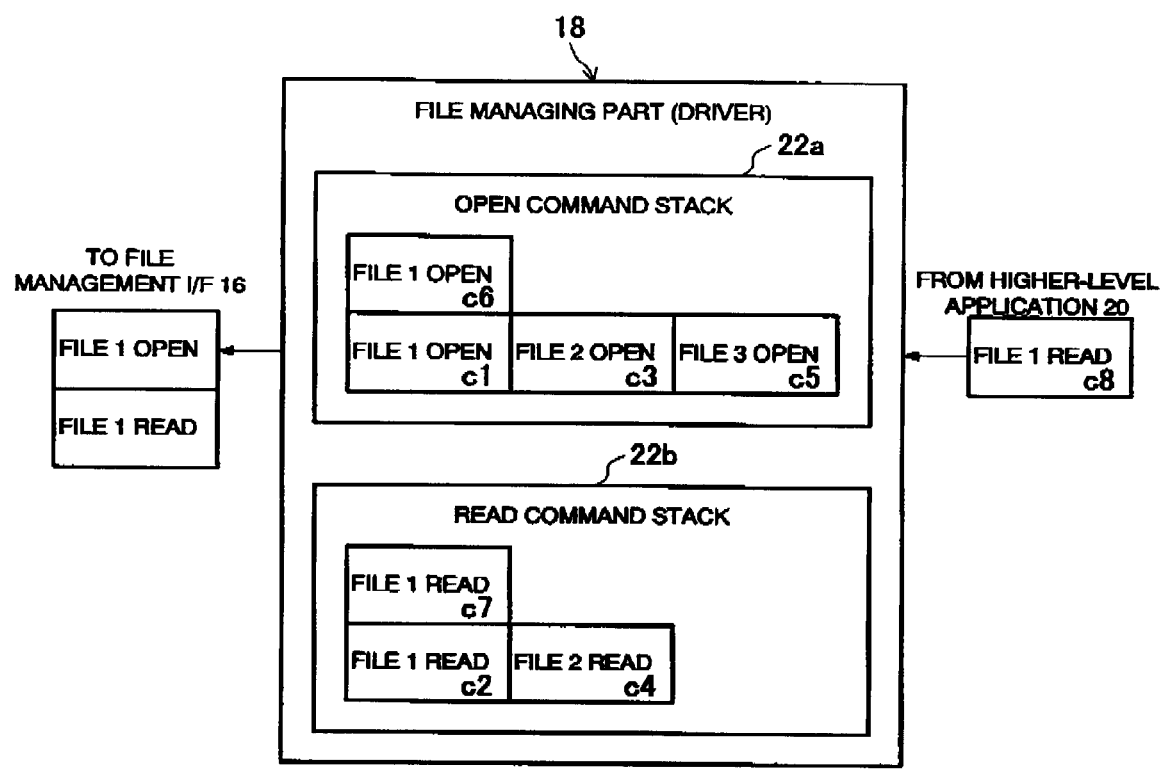
FIG. 4 is a diagram conceptually showing a function of the file managing part in FIG. 2.

Specifically, a plurality of access requests generated by the access request generating part 19 of the higher-level application 20 are sequentially stored in the access request storage part 22 included in the file managing part 18. Concretely, as shown in FIG. 4, in the access request storage part 22, open requests are sequentially stored as an open command stack 22a on per file basis, and read requests are sequentially stored as a read command stack 22b on per file basis. Further, in the access request storage part 22, write requests are sequentially stored as a write command stack on per file basis.

The virtual access responding part 23 sends virtual response notices in which the access requests sequentially stored in the access request storage part 22 are virtualized as already notified to the controlled processing apparatus 12, to the access request generating part 19 of the higher-level application 20 in response to the access requests. From this, the access request generating part 19 recognizes that the access requests generated by itself have already been notified normally to the controlled processing apparatus 12.

The access request notifying part 25 integrates plural ones of the access requests in the access request storage part 20 based on a storage status in the access request storage part 22 and notifies the integrated access request to the controlled processing apparatus 12. To be in more detail, in the access condition storage part 24, stored in advance is an access condition to the effect that, when the number of specific access requests in the access request storage part 22 exceeds a predetermined threshold value, the access requests should be notified in an integrated manner.

Specifically, the access request notifying part 25 monitors the storage status in the access request storage part 22 while referring to the inside of the access condition storage part 24, and at a point in time when the storage status satisfies the access condition, it integrates the plural access requests to a file satisfying the access condition and notifies the integrated access request. Further, when notifying write requests or read requests as the access requests to the file in the integrated manner, the access request notifying part 25 integrates one open request and one write or read request or more to notify the integrated request.

To be in more detail, for example, when the accumulation of three write requests to the same file is the access condition and the third write request is stored in the access request storage part 22, the access request notifying part 25 at this instant integrates one open request and, for example, the three different data write requests to the relevant file and notifies the integrated access request to the file management interface 16 of the controlled processing apparatus 12 via the network 15.

Such a file management function of the file managing part 18 can practically save two open requests and two close requests accompanying the first and second write requests, which can realize higher efficiency of processing regarding the accesses to the file. Further, the aforethe file access executing part 11 shown in FIG. 1 executes accesses to the files 1, 2, 3 . . . in the file storage part 17 based on the integrated access request thus notified by the access request notifying part 25.

Figure 3:
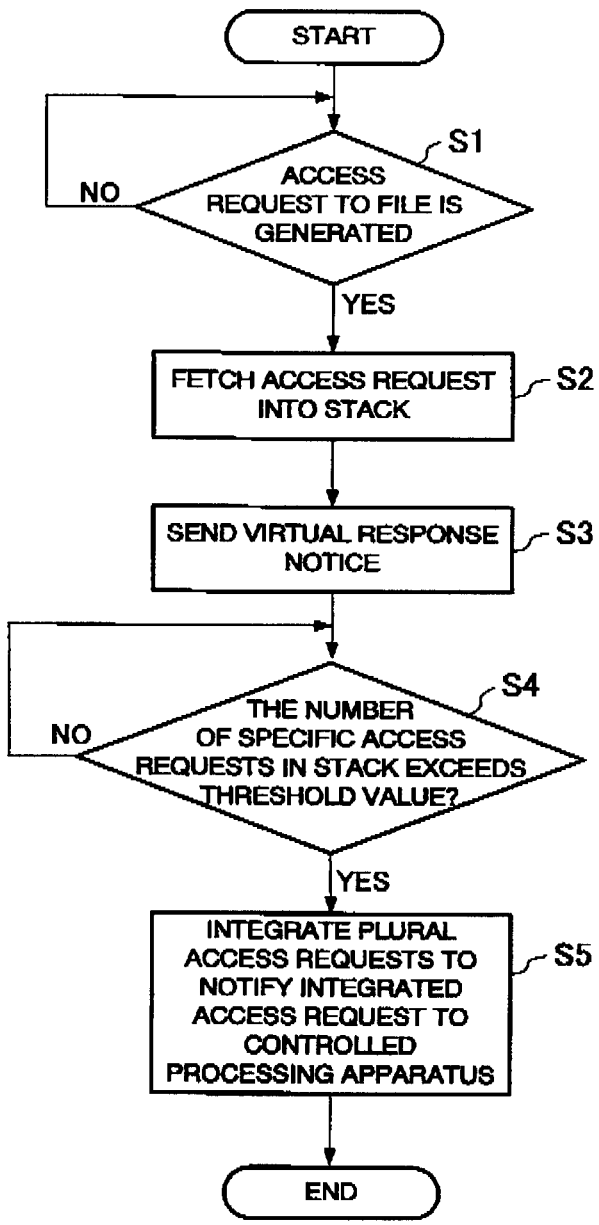
FIG. 3 is a flowchart showing processing performed by the file managing part in FIG. 2.

Next, processing performed by the file managing part 18 as structured above will be described based on the flowchart shown in FIG. 3. First, when an access request to any of the files 1, 2, 3 . . . in the file storage part 17 is generated via the access request generating part 19 of the higher-level application 20 (YES at S1), the access request storage part 22 of the file managing part 18 fetches the generated access request into a corresponding one of the command stacks exemplified in FIG. 4 (S2).

The virtual access responding part 23 sends the virtual response notice in which each of the access requests sequentially stored as the command stacks in the access request storage part 22 is virtualized as already notified to the controlled processing apparatus 12, to the access request generating part 19 of the higher-level application 20 in response to the access request (S3).

Subsequently, when detecting that the number of specific access requests to any of the files in the command stacks in the access request storage part 22 exceeds the threshold value while referring to the access condition in the access condition storage part 24 (YES at S4), the access request notifying part 25 integrates a plurality of access requests generated for the relevant file and stored in the access request storage part 22 to notify the integrated access request to the controlled processing apparatus 12 (S5).

The processing performed by the file managing part 18 will be further described in detail based on the conceptual view shown in FIG. 4. As shown in FIG. 4, it is assumed that a request for opening (OPEN command c1) of the file 1 stored in the file storage part 17 is sent from the access request generating part 19 of the higher-level application 20 to the file managing part 18. The access request storage part 22 of the file managing part 18 fetches the open request of the file 1 into the open command stack 22a of its own. Meanwhile, the virtual access responding part 23 sends the virtual response notice in which the open request of the file 1 is virtualized as already notified to the controlled processing apparatus 12, to the access request generating part 19 in response to the open request of the file 1.

It is assumed that a read request (READ command c2) of the file 1 is next sent from the access request generating part 19 to the file managing part 18. In response to the read request, the virtual access responding part 23 also sends, to the access request generating part 19, the virtual response notice in which the read request is virtualized as already notified. It is assumed that as a result of repeating the processing corresponding to a plurality of access requests (access commands c3 to c7) in this manner, two open requests (OPEN commands) of the file 1, one open request of each of the files 2, 3, and two read requests (READ commands) of the file 1, and one read request of the file 2 are fetched into the open command stack 22a and the read command stack 22b of the access request storage part 22.

It is assumed that, at this instant, a read request (READ command c8) of the file 1 is sent from the access request generating part 19 to the file managing part 18. Here, for example, when the access condition to the effect that three read requests to one file are accumulated is stored (set) in the access condition storage part 24, the open command stacks and the read command stacks of the file 1 are made empty and one open request and one read request (in the integrated manner) are notified to the file management interface 16 of the controlled processing apparatus 12.

In the event of this processing, the opening and a read start time of the file are delayed by a time taken for the access requests to be accumulated in the command stacks, but since the file sharing system 10 of this embodiment is capable of sending a large number of access requests such as open requests and read requests in a short time as described above, the delay to this extent is not particularly problematic. That is, in the file sharing system 10, the number of times open requests and read requests are notified from the remote controlling processing apparatus 14 to the controlled processing apparatus 12 can be practically reduced and a load of the controlled processing apparatus with a low specification can be reduced, and performance demanded by the higher-level application 20 of the remote controlling processing apparatus 14 with a high specification can be satisfied.

Further, when the number of files that can be kept open is limited to, for example, two due to the restriction by the specification of the controlled processing apparatus 12, sequentially notifying the access requests c1 to c7 shown in FIG. 4 to the controlled processing apparatus 12 as has been performed in the existing processing (for example, employing a LRU [Least Recently Used] method) would necessitate the closing of the file 1 at an instant of the notification of the access request c5. When the access request c6 is thereafter notified, it becomes necessary to close the file 2 at the same time when the file 1 is opened, and in such existing processing, the number of times the files are opened and closed increases, resulting in lower performance.

On the other hand, in the file sharing system 10 of this embodiment, since the file 1 is opened at an instant when the access request c8 is generated, it is possible to prevent performance deterioration caused by the frequent opening and closing.

As described above, according to the file sharing system 10 of this embodiment, a plurality of access requests that the higher-level application 20 (access request generating part 19) of the remote controlling processing apparatus 14 generates for the files 1, 2, 3 . . . in the file storage part 17 of the controlled processing apparatus 12 are sequentially stored, and based on the storage status, plural ones of the access requests are integrated based on the storage status and the integrated access request is notified from the remote controlling processing apparatus 14 to the controlled processing apparatus 12, which enables efficient processing for accessing the files.

(Second Embodiment)

Figure 5:
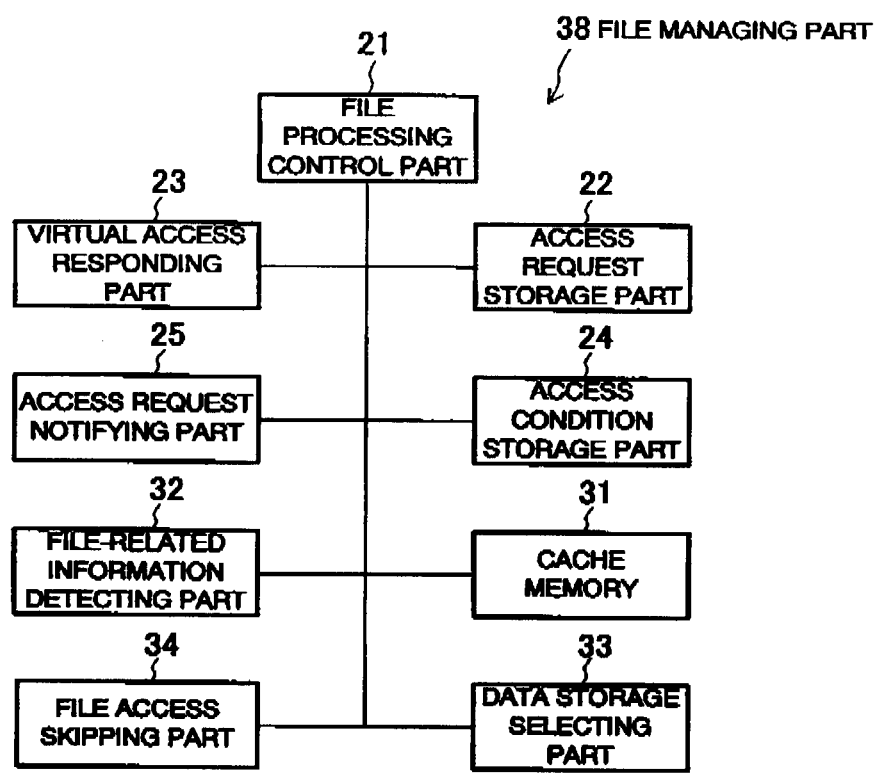
FIG. 5 is a functional block diagram showing the configuration of a file managing part included in a file sharing system according to a second embodiment of the present invention.
Figure 6:
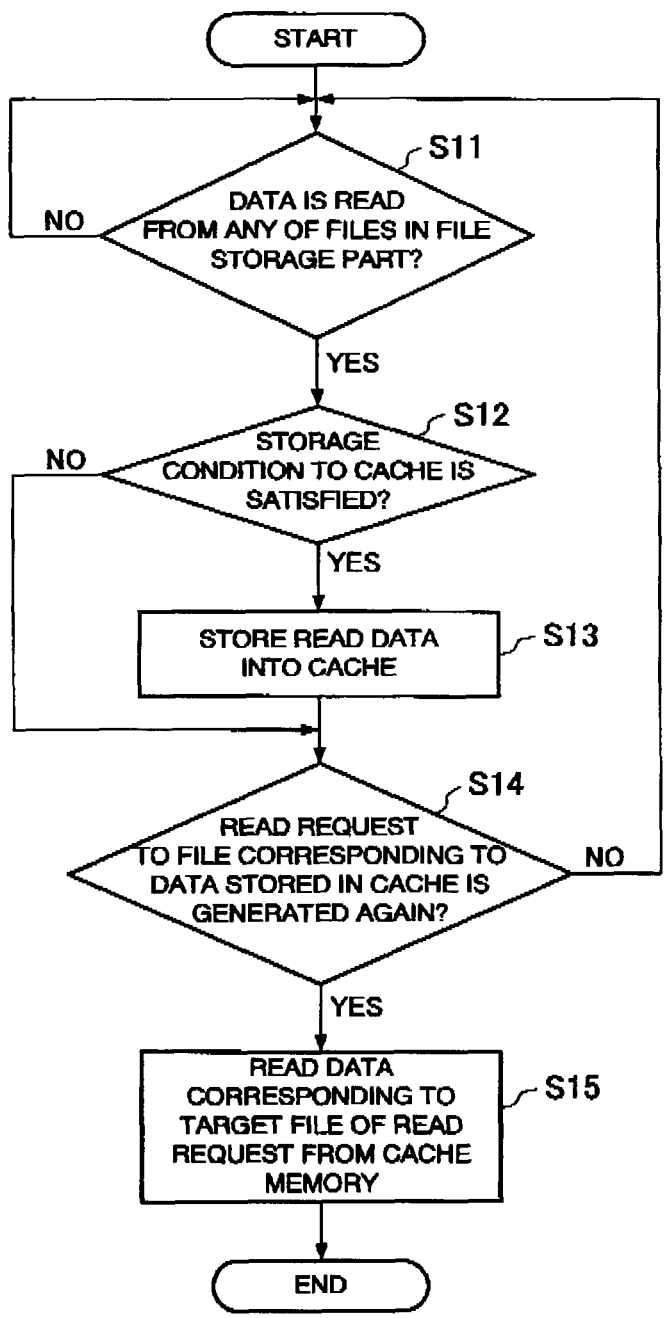
FIG. 6 is a flowchart showing processing performed by the file managing part in FIG. 5.
Figure 7:
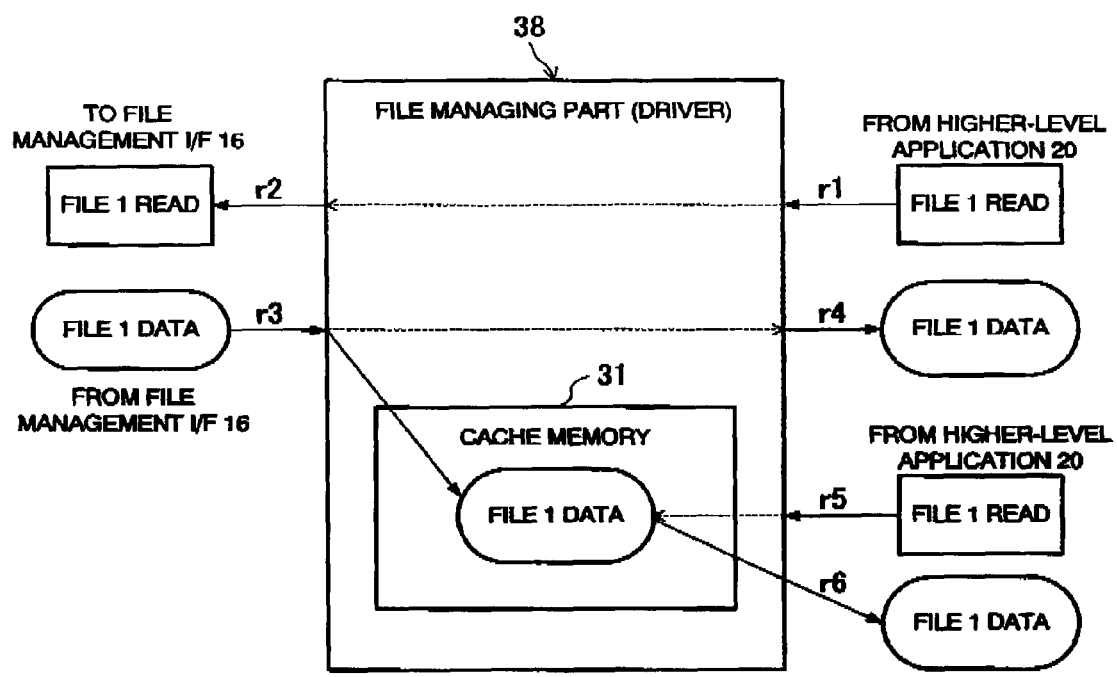
FIG. 7 is a diagram conceptually showing a function of the file managing part in FIG. 5.

Next, a second embodiment of the present invention will be described based on FIG. 5 to FIG. 7. In FIG. 5 to FIG. 7, the same constituent elements as the constituent elements in the first embodiment shown in FIG. 2 and FIG. 4 are denoted by the same reference numerals and symbols and detailed description thereof will be omitted.

As shown in FIG. 5, a file sharing system according to the second embodiment includes a file managing part 38 in place of the file managing part 18 provided in the remote controlling processing apparatus 14. The file managing part 38 includes not only the constituent elements of the file managing part 18 but also a cache memory 31 as a read data storage part, a file-related information detecting part 32, a data storage selecting part 33, and a file access skipping part 34.

The cache memory 31 is a storage area for storing data that are read from files 1, 2, 3 . . . in a file storage part 17 in response to a read request from an access request notifying part 25. When a read request to a file, in the file storage part 17, containing data read into the cache memory 31 is generated again by an access request generating part 19, the file access skipping part 34 reads the corresponding data from the inside of the cache memory 31.

The file-related information detecting part 32 detects information related to the file corresponding to the data which is read from the file storage part 17 in response to the read request notified by the access request notifying part 25. The data storage selecting part 33 selects whether or not the data read from the target file of the read request is to be stored in the cache memory 31, based on the detection result by the file-related information detecting part 32.

More concretely, the file-related information detecting part 32 detects size (data size) of the file and/or the kind of the file as the information related to the file read from the file storage part 17. The data storage selecting part 33 selects whether or not the data read from the target file of the read request should be stored in the cache memory 31, based on the detected size of the file and/or the detected kind of the file.

Specifically, in the data storage selecting part 33, a threshold value of the file size for permitting the storage into the cache memory 31 and several extensions specifying the kinds of files are registered in advance as a data storage condition. Therefore, when a file whose file size is, for example, less than the threshold value and which has the pre-registered extension is detected by the file-related information detecting part 32, the data storage selecting part 33 stores the data read from this file into the cache memory 31.

Next, processing performed by the file managing part 38 as structured above will be described based on the flowchart shown in FIG. 6. First, when data is read from any of the files 1, 2, 3 . . . in the file storage part 17 in a controlled processing apparatus 12 (YES at S11), the file-related information detecting part 32 in the file managing part 38 of a remote controlling processing apparatus 14 obtains the read data and detects the size and kind of the file corresponding to this data.

The data storage selecting part 33 determines whether the detected size and kind of the file satisfy the data storage condition (S12), and stores the read data into the cache memory 31 when the data storage condition is satisfied (YES at S12).

When a read request of the file corresponding to the data stored in the cache memory 31 is thereafter generated again from the access request generating part 19 of a higher-level application 20 (YES at S14), the file access skipping part 34 of the file managing part 38 reads the data corresponding to the target file of the read request from the cache memory 31 (S15) and sends the read data to the higher-level application 20.

The processing performed by the file managing part 38 will be further described in detail based on the conceptual view shown in FIG. 7. As shown in FIG. 7, it is assumed that a read request (READ command r1) of the file 1 stored in the file storage part 17 is sent from the access request generating part 19 of the higher-level application 20 to the file managing part 38. At an instant when an access condition is satisfied, an access request notifying part 25 of the file managing part 38 actually notifies a read request (READ command r2) included in an integrated access request to a file management interface 16 of the controlled processing apparatus 12.

A file access executing part 11 in the file management interface 16 reads the data of the file 1 in the file storage part 17 and transmits the read data to the file managing part 38 of the remote controlling processing apparatus 14 (r3). Further, the file managing part 38 transmits the received data of the file 1 to the higher-level application 20 (r4) and at the same time, stores the data of the file 1 into the cache memory 31 when the aforethe data storage condition is satisfied.

When a read request of the file corresponding to the data stored in the cache memory 31 is thereafter generated again from the higher-level application 20 (r5), the file access skipping part 34 of the file managing part 38 reads the corresponding data from the cache memory 31 to send the read data to the higher-level application 20 (r6).

Therefore, according to the file sharing system according to this embodiment, when a read request to the file, in the file storage part 17, containing data once read into the cache memory 31 is generated again by the access request generating part 19, it is possible to directly read the corresponding data from the cache memory 31, which can shorten the time required for reading the data.

(Third Embodiment)

Figure 8:
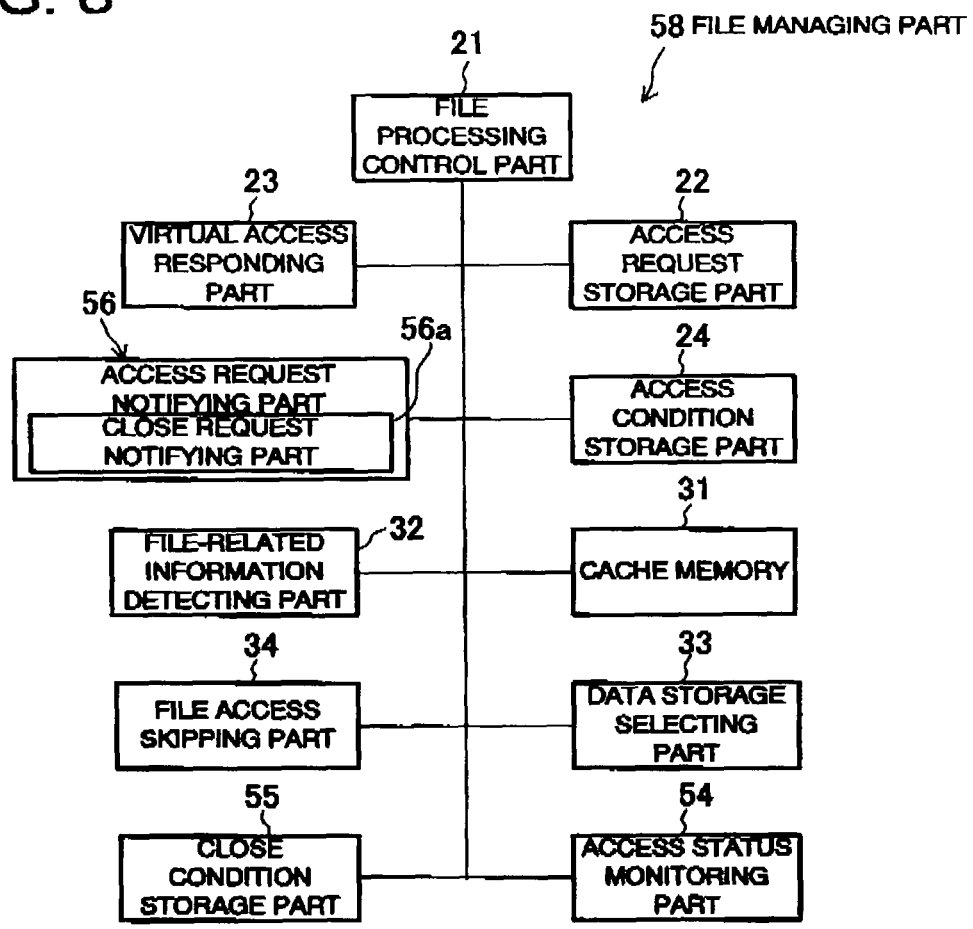
FIG. 8 is a functional block diagram showing the configuration of a file managing part included in a file sharing system according to a third embodiment of the present invention.

Next, a third embodiment of the present invention will be described based on FIG. 8 and FIG. 9. In FIG. 8, the same constituent elements as the constituent elements of the first and second embodiments shown in FIG. 2 and FIG. 5 will be denoted by the same reference numerals and symbols and detailed description thereof will be omitted.

As shown in FIG. 8, a file sharing system according to the third embodiment includes a file managing part 58 in place of the file managing part 38 provided in the remote controlling processing apparatus of the second embodiment. The file managing part 58 includes an access request notifying part 56 in place of the access request notifying part 25 which is a constituent element of the file managing part 38, and additionally includes an access status monitoring part 54 and a close condition storage part 55.

The access status monitoring part 54 monitors an access status of each file in a file storage part 17, and for example, detects the number of files in an open state in the file storage part 17. The access request notifying part 56 includes a close request notifying part 56a. The close request notifying part 56a notifies a controlled processing apparatus 12 of a close request of a file that is selected from the plural files 1, 2, 3 . . . in the open state in the file storage part 17 based on the monitoring result by the access status monitoring part 54. The close request notifying part 56a selects a file satisfying a close condition stored in the close condition storage part 55, as a file whose close request is to be notified.

Concretely, the access status monitoring part 54 detects the frequency of read or write from/to each file in the file storage part 17 or detects a least recently opened file from the plural files in the open state in the file storage part 17. The frequency of the read or write from/to each file can be found from the number of times a read function or a write function is called.

The access status monitoring part 54 further detects data size of data that is read or written from/to each file in the file storage part 17 during a predetermined time, and detects the file names of the files in the open state in the file storage part 17 and the times at which the files are opened. Further, the access status monitoring part 54 obtains file attributes showing read-only files, hidden files, or the like, the file names, the kinds (extensions) of the files, as information related to the files in the file storage part 17.

In the close condition storage part 55, there is registered in advance a condition based on which the close request notifying part 56a selects a file whose close request is to be notified, from the plural files in the open state in the file storage part 17. Further, in the close condition storage part 55, stored is the close condition to the effect that the close request of the selected file should be notified when the number of the files in the open state in the file storage part 17 exceeds a threshold value. More concretely, in the close condition storage part 55, a LFU (Least Frequently Used) condition, a LRU (Least Recently Used) condition, a point-system condition, a file-type-based priority condition, and so on are registered in advance.

Specifically, the LFU condition is a condition employing a LFU method that defines a file with the lowest read or write frequency, as a file whose close request is to be notified, and the LRU condition is a condition utilizing a LRU method that defines a least recently opened file as a file whose close request is to be notified. Further, the point-system condition is a condition using a point system adding the read and write frequency and the recentness of the read and write and defining a file with the lowest point as a file whose close request is to be notified. The file-type-based priority condition is a condition assigning a priority sequence to each kind of file in advance and defining a file of a type with the lowest priority as a file whose close request is to be notified. Incidentally, a close condition under which a file with a threshold value or a specific file attribute is closed based on file data size, a close condition under which a file is closed based on data size, or the like may be stored in the close condition storage part 55.

While referring to the above close condition in the close condition storage part 55, the aforethe close request notifying part 56*a* selects a file whose close request is to be notified, based on the read or write frequency, or selects a least recently opened file as a file whose close request is to be notified. Further, while referring to the close condition in the close condition storage part 55, the close request notifying part 56*a* selects a file whose close request is to be notified, based on the file name (or read or write frequency) and the time at which the file is opened, and further selects a file whose close request is to be notified, based on the detected data size of the file (or file attribute).

Here, it is changeable as required which of the close conditions exemplified above the close request notifying part 56*a* employs. For example, while referring to a predetermined user interface, a user may select one of the close conditions to set the selected close condition in the file managing part 58, or one of the close conditions may be set fixedly in the file managing part 58 in advance.

Next, processing performed by the file managing part 58 as structured above will be described based on the flowchart shown in FIG. 9. First, when a file in an open state satisfying the close condition is present (YES at S22) while the access status monitoring part 54 is monitoring an access status of each file in the file storage part 17 (S21), the close request notifying part 56*a* selects the file in the open state satisfying the close condition (S23). Further, the close request notifying part 56*a* notifies the close request of the selected file to the controlled processing apparatus 12 (a file management interface 16), and accordingly a file access executing part 11 closes the selected file.

Therefore, according to the file sharing system according to this embodiment, it is possible to prevent, for example, a file with high read/write frequency from being closed, which enables efficient processing regarding accesses to files.

In the foregoing, the present invention is more concretely described based on the first to third embodiments, but the present invention is not limited to these embodiments, and these embodiments are variously changeable without departing from the spirit of the present invention. For example, for the connection between the controlled processing apparatus 12 and the remote controlling processing apparatus 14, a network other than LAN may be employed, though LAN is employed as an example in the above-described embodiments. Further, they may be connected by, for example, a USB interface, an IEEE1394 interface, or the like other than a network.

Further, concrete examples of the application and so on of the controlled processing apparatus being the first information processing apparatus are not shown, but for example, broadcasting apparatuses used for terrestrial digital TV broadcasting, BS analog/digital broadcasting, CS analog/digital broadcasting, Internet-compatible TV broadcasting, and so on in which wired or wireless distribution of moving images are performed are applicable as the first information processing apparatus of the present invention. Besides, electronic apparatuses using a built-in system or the like such as electronic measuring machines, industrial automatic machines, automobile control systems, car navigation systems, and medical equipment are all applicable as the first information processing apparatus of the present invention.

What is claimed is:

1. A file sharing system, comprising:
   a first information processing apparatus including a file storage part configured to store a plurality of files; and
   a second information processing apparatus connected to the first information processing apparatus via a network and configured to access each of the files in the file storage part,
   wherein the second information processing apparatus comprises:
   an access request generating part configured to generate access requests to the files in the file storage part;
   an access request storage part configured to sequentially store a plurality of access requests generated by the access request generating part;
   an access request notifying part configured to integrate two or more of the plurality of access requests in the access request storage part based on a storage status in the access request storage part to notify the integrated access request to the first information processing apparatus; and
   a virtual access responding part sending a virtual response notice in which the access requests sequentially stored in the access request storage part are virtualized as already notified to the first information processing apparatus, to the access request generating part in response to the access requests.

2. The file sharing system according to claim 1,
   wherein, when a number of specific access requests in the access request storage part exceeds a threshold value, the access request notifying part integrates the specific access requests in the access request storage part to notify the integrated access request to the first information processing apparatus.

3. The file sharing system according to claim 1,
   wherein the first information processing apparatus comprises a file access executing part configured to execute accesses to the files in the file storage part, based on the integrated access request notified by the access request notifying part.

4. The file sharing system according to claim 1,
   wherein the access requests generated by the access request generating part are each a read request, a write request, an open request, or a close request to any of the files in the file storage part, and
   wherein, when integrating the write requests or the read requests as the access requests to notify the integrated access request, the access request notifying part integrates one open request and one write or read request or more to notify the integrated request.

5. The files sharing system according to claim 4,
   wherein the second information processing apparatus further comprises:
   a read data storage part configured to store data read from the files in the file storage part in response to the read request from the access request notifying part; and
   a file access skipping part configured to read corresponding data from the read data storage part, when the read request of the file, in the file storage part, containing the data read into the read data storage part is generated again by the access request generating part.

6. The file sharing system according to claim 5,
wherein the second information processing apparatus further comprises:
- a file-related information detecting part configured to detect information related to the file whose data is read from the file storage part in response to the read request from the access request notifying part; and
- a data storage selecting part configured to select whether or not the data read from the target file of the read request is to be stored in the read data storage part, based on a result of the detection by the file-related information detecting part.

7. The file sharing system according to claim 6,
wherein the file-related information detecting part detects size of the file and/or kind of the file as the information related to the file; and
wherein the data storage selecting part selects whether or not the data read from the target file of the read request is to be stored in the read data storage part, based on the detected size and/or kind of the file.

8. The file sharing system according to claim 4,
wherein the second information processing apparatus further comprises an access status monitoring part monitoring an access status of each of the files in the file storage part; and
wherein the access request notifying part comprises a close request notifying part notifying the first information processing apparatus of a close request of a file that is selected from plural files in an open state in the file storage part, based on a result of the monitoring by the access status monitoring part.

9. The file sharing system according to claim 8,
wherein the close request notifying part notifies the close request of the selected file when the number of the files in the open state in the file storage part exceeds a threshold value.

10. The file sharing system according to claim 8,
wherein the access status monitoring part detects a read or write frequency of each of the files in the file storage part, and
wherein the close request notifying part selects a file whose close request is to be notified, based on the read or write frequency.

11. The file sharing system according to claim 8,
wherein the access status monitoring part detects a least recently opened file from the plural files in the open state in the file storage part; and
wherein the close request notifying part selects the least recently opened file as the file whose close request is to be notified.

12. The file sharing system according to claim 8,
wherein the access status monitoring part obtains at least one of a file attribute, a file name, and a kind of file as information related to each of the files in the file storage part, and
wherein the close request notifying part selects the file whose close request is to be notified, based on the obtained information related to the files.

13. The file sharing system according to claim 8,
wherein the access monitoring part detects file names of the files in the open state in the file storage part and times at which the files are opened, and
wherein the close request notifying part selects the file whose close request is to be notified, based on the detected file names and times at which the files are opened.

14. The file sharing system according to claim 8,
wherein the access status monitoring part detects data size of data that is read or written from/to each of the files in the file storage part during a predetermined time, and
wherein the close request notifying part selects the file whose close request is to be notified, based on the detected data size.

* * * * *

UNITED STATES PATENT AND TRADEMARK OFFICE
CERTIFICATE OF CORRECTION

PATENT NO. : 8,458,281 B2
APPLICATION NO. : 12/723043
DATED : June 4, 2013
INVENTOR(S) : Kamijima et al.

Page 1 of 1

It is certified that error appears in the above-identified patent and that said Letters Patent is hereby corrected as shown below:

In the Claims

Claim 5, column 10, line 55, change "files sharing" to --file sharing--.

Signed and Sealed this
First Day of October, 2013

Teresa Stanek Rea
*Deputy Director of the United States Patent and Trademark Office*